United States Patent
Kokubo et al.

(10) Patent No.: US 9,095,944 B2
(45) Date of Patent: Aug. 4, 2015

(54) WORK SETTING APPARATUS, WORK SETTING METHOD, AND WORK HOLDER REMOVING METHOD

(71) Applicant: Toshiba Kikai Kabushiki Kaisha, Tokyo (JP)

(72) Inventors: Mitsunori Kokubo, Numazu (JP); Yuki Sugiura, Mishima (JP); Toru Suzuki, Fuji (JP); Hidetoshi Kitahara, Atami (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 177 days.

(21) Appl. No.: 13/691,574

(22) Filed: Nov. 30, 2012

(65) Prior Publication Data

US 2013/0167350 A1    Jul. 4, 2013

(30) Foreign Application Priority Data

Dec. 1, 2011   (JP) ................ 2011-263407

(51) Int. Cl.
*B23Q 3/08*   (2006.01)
*B23Q 7/00*   (2006.01)
(Continued)

(52) U.S. Cl.
CPC *B23Q 7/00* (2013.01); *B23Q 3/088* (2013.01); *B25B 11/005* (2013.01); *B29C 43/021* (2013.01); *B29C 43/36* (2013.01); *B32B 37/10* (2013.01); *B32B 43/00* (2013.01); *B29C 2043/025* (2013.01); *B29C 2043/5092* (2013.01); *B29C 2043/5833* (2013.01); *B32B 37/003* (2013.01); *B32B 37/0007* (2013.01); *B32B 37/1009* (2013.01); *B32B 37/1018* (2013.01); *B32B 37/1207* (2013.01); *B32B 38/06* (2013.01); *B32B 38/1841* (2013.01);
(Continued)

(58) Field of Classification Search
USPC .......... 29/559, 709, 713, 722, 787, 238, 239, 29/281.1, 281.3, 281.4, 281.5, 407.09, 29/407.1, 465, 468, 821
See application file for complete search history.

(56) References Cited

U.S. PATENT DOCUMENTS 6,145,901 A    11/2000  Rich
7,850,815 B2 *  12/2010  Kaizu et al. ............. 156/285
(Continued)

FOREIGN PATENT DOCUMENTS

CN   201436515   4/2010
JP   H03-065542  3/1991
(Continued)

OTHER PUBLICATIONS

English Language Abstract of JP 2008-074015 published Apr. 3, 2008.
(Continued)

*Primary Examiner* — Alexander P Taousakis
*Assistant Examiner* — Matthew P Travers
(74) *Attorney, Agent, or Firm* — DLA Piper LLP (US)

(57) ABSTRACT

A work setting apparatus includes a lower table 15, an upper table 17, and a work holding unit 19 provided with a plurality of work holders 25 each having an adhesive to hold a work. A work setting method sets a second work W2 held by the work holders 25 onto a first work W1 set on the lower table 17. A work holder removing method removes the work holders 25 from the second work W2 set on the first work W1 by vibrating the first and second works W1 and W2 on the lower table 15.

3 Claims, 14 Drawing Sheets

(51) Int. Cl.
  *B25B 11/00* (2006.01)
  *B29C 43/36* (2006.01)
  *B32B 37/10* (2006.01)
  *B32B 43/00* (2006.01)
  *B29C 43/02* (2006.01)
  *B32B 37/00* (2006.01)
  *B32B 37/12* (2006.01)
  *B32B 38/18* (2006.01)
  *B32B 41/00* (2006.01)
  *B32B 38/06* (2006.01)
  *B29C 43/50* (2006.01)
  *B29C 43/58* (2006.01)

(52) U.S. Cl.
  CPC ........ *B32B 38/1858* (2013.01); *B32B 2041/04* (2013.01); *B32B 2309/68* (2013.01); *B32B 2309/70* (2013.01); *B32B 2310/0831* (2013.01); *B32B 2315/08* (2013.01); *B32B 2457/202* (2013.01); *B32B 2551/00* (2013.01); *Y10T 29/49822* (2015.01); *Y10T 29/49826* (2015.01); *Y10T 29/53096* (2015.01); *Y10T 29/53535* (2015.01)

(56) References Cited

U.S. PATENT DOCUMENTS

| | | | |
|---|---|---|---|
| 2009/0056866 A1 | 3/2009 | Hwang | |
| 2010/0087033 A1* | 4/2010 | Mizoguchi et al. | 438/107 |

FOREIGN PATENT DOCUMENTS

| | | |
|---|---|---|
| JP | 08-281173 | 10/1996 |
| JP | 2001-310834 | 11/2001 |
| JP | 2003-078294 | 3/2003 |
| JP | 2005-153091 | 6/2005 |
| JP | 2008-074015 | 4/2008 |
| KR | 10-2010-0018458 | 2/2010 |
| KR | 2010-0077165 | 7/2010 |
| TW | 200402115 | 2/2004 |
| TW | 200519455 | 6/2005 |
| TW | 200821678 | 5/2008 |
| TW | 200912388 | 3/2009 |
| TW | 201000309 | 1/2010 |
| TW | 201037371 | 10/2010 |
| TW | 201133058 | 10/2011 |
| TW | 201137436 | 11/2011 |
| WO | WO 2008/081838 | 7/2008 |

OTHER PUBLICATIONS

English Language Translation of JP 2008-074015 published Apr. 3, 2008.
English Language Abstract of JP 2001-310834 published Nov. 6, 2001.
English Language Translation of JP 2001-310834 published Nov. 6, 2001.
Korean Office Action issued in KR 10-2012-0135322 dated Feb. 24, 2014.
English Language and Abstract of JP H08-281173 published Oct. 29, 1996.
Korean Office Action issued in KR 10-2012-0137962 dated Feb. 19, 2014.
English Language Abstract and Translation for KR-2010-0077165 published Jul. 7, 2010.
English Language Abstract and Translation for JP 2003-078294 published Mar. 14, 2003.
Korean Office Action issued in KR 10-2013-7008117 dated Mar. 17, 2014.
English Language Abstract for KR 10-2010-0018458 published Feb. 17, 2010.
English Language Abstract and Translation for JP 2005-153091 published Jun. 16, 2005.
U.S. Appl. No. 13/686,693.
U.S. Appl. No. 13/686,674.
Taiwanese Office Action issued in TW101144296 dated Nov. 19, 2014 with translation.
Taiwanese Office Action issued in TW101144734 dated Nov. 19, 2014 with translation.
English Language Abstract for TW201000309 published Jan. 1, 2010.
English Language Abstract for TW201133058 published Oct. 11, 2011.
English Language Abstract for TW200402115 published Feb. 1, 2004.
English Language Abstract for CN201436515 published Apr. 7, 2010.
English Language Abstract for TW200912388 published Mar. 16, 2009.
English Language Abstract for JP H03-065542 published Mar. 20, 1991.
English Language Abstract for TW201037371 published Oct. 16, 2010.
English Language Abstract for TW200519455 published Jun. 16, 2005.
English Language Abstract for TW200821678 published May 16, 2008.
English Language Abstract for TW201137436 Nov. 1, 2011.

* cited by examiner

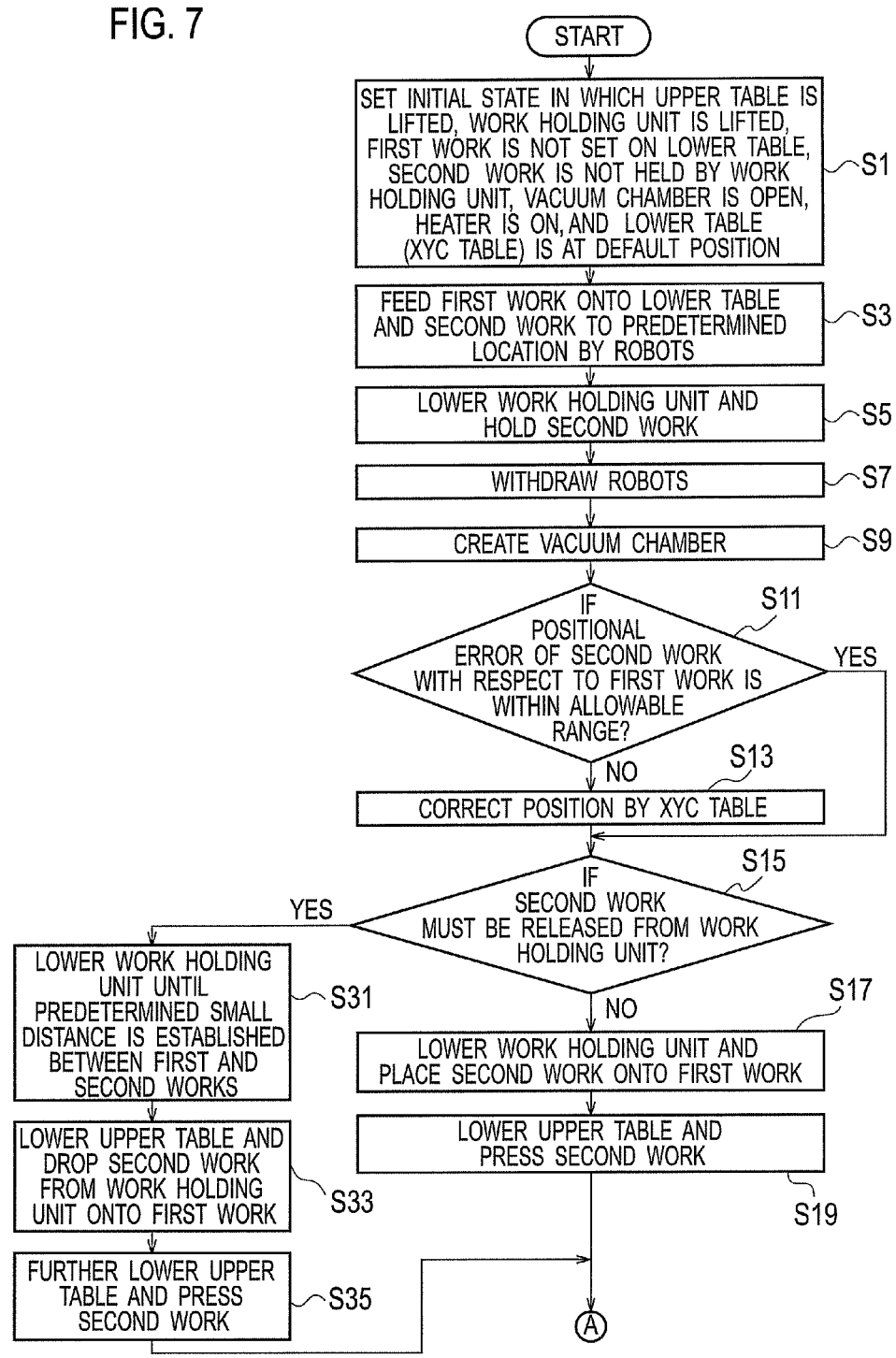

WORK SETTING APPARATUS, WORK SETTING METHOD, AND WORK HOLDER REMOVING METHOD

BACKGROUND OF THE INVENTION

1. Field of the Invention

The present invention relates to a work setting apparatus, a work setting method, and a work holder removing method that removes a work from a work holder by, for example, vibrating the work.

2. Description of Related Art

There is a known work setting apparatus that employs a plurality of work holders to hold a work, sets the work held by the work holders onto another work, and removes the work holders from the works. This type of technique is disclosed in, for example, Japanese Unexamined Patent Application Publications No. 2008-74015 and No. 2001-310834.

SUMMARY OF THE INVENTION

These related arts that hold a work by a plurality of work holders, set the work onto another work, and remove the work holders from the set works have a problem that the work holders are hardly removed from the set works.

To solve the problem, the present invention provides a work setting apparatus, work setting method, and work holder removing method, capable of setting a work held by a plurality of work holders onto another work and easily removing the work holders from the set works.

According to a first aspect of the present invention, the work setting apparatus includes a first table on which a first work is set, a second table that is moved toward and away from the first table and is positioned with respect to the first table, a table positioning unit that moves and positions the first table with respect to the second table in directions orthogonal to the moving directions of the second table, a work holding unit having a plurality of work holders, each of the work holders having a cylindrical main body provided with an opening faced toward the first table, the work holders holding a second work with the use of vacuum suction and being moved toward and away from the first table and positioned with respect to the first table, and a control unit that controls the first table, second table, work holding unit, and table positioning unit. In a state that the second table is separated away from the first table, the work holders are positioned between the first and second tables, the first work is set on the first table, and the second work is held by the work holders, the control unit controls in such a way as to (a) move the work holders toward the first table so that an uncured membranous material of the second work held by the work holders is brought into contact with the first work set on the first table and the second work is set onto the first work, (b) move the second table toward the first table so that the first and second works are pressed between the first and second tables, (c) move, after carrying out the pressing of the first and second works for a predetermined time, the second table away from the first table so that the second table is separated from the second work, and (d) drive the table positioning unit to slightly vibrate the first and second works on the first table and move the work holders away from the first table so that the work holders are removed from the second work.

According to a second aspect of the present invention, the work setting method includes setting a first work on a first table, holding a second work, which includes a plate-like base material and an uncured membranous material arranged on one face of the base material, by a work holder that employs one of vacuum suction, adhesive, and vacuum suction plus adhesive to engage with another face of the second work, setting the second work onto the first work by moving the work holder holding the second work toward the first work set on the first table so that the uncured membranous material of the second work is brought into contact with the first work and the second work is set onto the first work, pressing the first and second works between the first table and a second table by moving the second table toward the second work, moving the second table away from the second work, and removing the work holder from the second work by slightly vibrating the first and second works set on the first table and by moving the work holder away from the first table.

According to a third aspect of the present invention, the work holder removing method includes removing a work holder, which holds a work with the use of at least one of vacuum suction and adhesive, from the work by vibrating at least one of the work and work holder.

BRIEF DESCRIPTION OF THE DRAWINGS

FIGS. 3A and 3B illustrate a product formed from first and second works by the work setting apparatus of FIG. 2, in which FIG. 3A is a plan view and FIG. 3B a side view seen from an arrow 111B of FIG. 3A;

FIGS. 5A and 5B illustrate a work holder of the work setting apparatus of FIG. 2, in which FIG. 5A is a sectional view and FIG. 5B a view seen from an arrow VB of FIG. 5A;

FIGS. 6A, 6B, and 6C illustrate modifications of the work holder of FIGS. 5A and 5B, in which FIG. 6A is a modification corresponding to FIG. 5A, FIG. 6B a modification of a part VIB of FIG. 6A, and FIG. 6C another modification corresponding to FIG. 5A;

FIGS. 7 and 8 are flowcharts illustrating operation of the work setting apparatus of FIG. 2.

DESCRIPTION OF PREFERRED EMBODIMENTS

Figure 1:
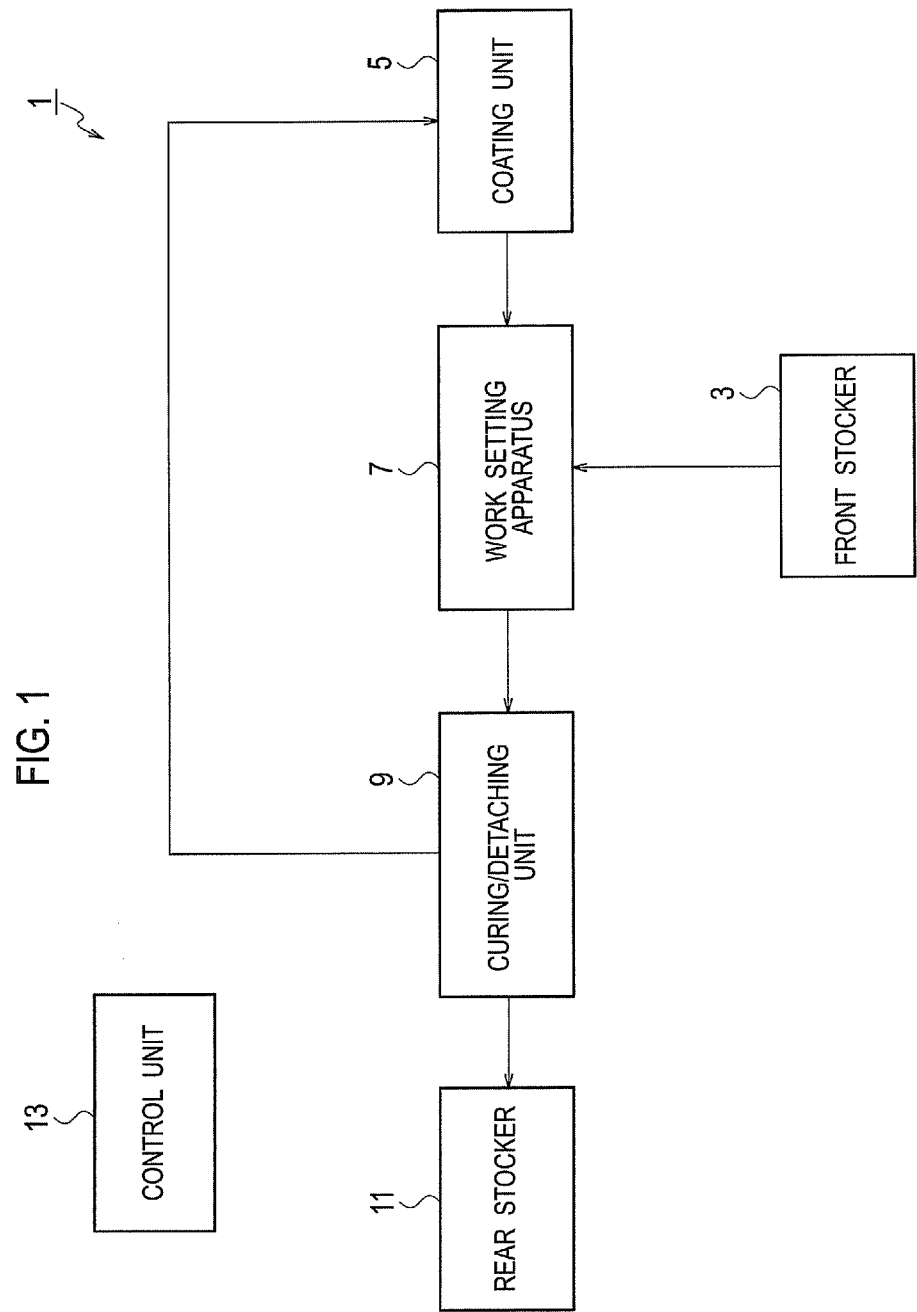
FIG. 1 is a block diagram schematically illustrating a work setting system involving a work setting apparatus according to an embodiment of the present invention.

FIG. 1 illustrates a work setting system 1 that sets a second work W2 onto a first work W1, to form a product W as illustrated in FIGS. 3A, 3B and 4A, 4B. The work setting system 1 includes a front stocker 3, a coating unit 5, a work setting apparatus 7 according to an embodiment of the present invention, a curing/detaching unit 9, a rear stocker 11, and a control unit 13.

The product W, first work W1, and second work W2 will be explained in detail with reference to FIGS. 3A to 4B.

The first work W1 is, for example, a prism sheet that is used as a backlight of a liquid crystal display. The first work W1 includes a base material W3 and fine protrusions W4. The base material W3 is a flat plate made of transparent synthetic resin such as PET resin. The protrusions W4 are each elongate and its cross-section is chevron shaped. The protrusions W4 are juxtaposed on a first face (top face in FIG. 4A) of the base material W3.

A second face (bottom face in FIG. 4A) of the prism sheet (first work) W1 opposite to the face where the projections W4 are arranged is flat. With the projections W4, the first face of the prism sheet W1 are corrugated with equally spaced fine lines. The chevron projections W4 are very small, and therefore, the prism sheet W1 as a whole is substantially flat.

The first work W1 may include a flat base material whose first surface (top face) is provided with irregularities of equally spaced small dots.

The second work W2 includes a base material W5 and a membranous material W6. An example of the base material W5 is a transparent glass plate. An example of the membranous material W6 is uncured ultraviolet curable resin that is arranged like a film over a first face of the glass plate W5.

The product W is, for example, a film-coated prism sheet and is formed by setting the membranous material W6 onto the first work W1. More precisely, the protrusions W4 of the first work W1 and the uncured membranous material W6 of the second work W2 are placed to face each other and the first and second works W1 and W2 are brought close to each other so that the uncured membranous material W6 comes in contact with the protrusions W4, the base materials W3 and W5 sandwich the protrusions W4 and uncured membranous material W6, and the protrusions W4 receive the uncured membranous material W6 without gaps. Thereafter, the uncured membranous material W6 is cured and the base material W5 is removed from the cured membranous material W6, thereby forming the product W.

The product W is, for example, a rectangular flat plate having a side length of about 1000 mm with the base material W3, protrusions W4, and cured membranous material W6 being layered one on another and solidified together. The product W is properly cut into pieces when used as a backlight of a liquid crystal display of, for example, a cellular phone.

In FIG. 1, the front stocker 3 stores the first work W1. The coating unit 5 applies the uncured membranous material W6 to the base material W5. The work setting apparatus 7 sets the second work W2 supplied from the coating unit 5 onto the first work W1 supplied from the front stocker 3. The curing/detaching unit 9 irradiates the uncured membranous material W6 of the first and second works W1 and W2 supplied from the work setting apparatus 7 with ultraviolet rays to cure the uncured membranous material W6 and detaches the base material W5 from the cured membranous material W6 to provide the product W. The rear stocker 11 stores the product W provided by the curing/detaching unit 9.

The control unit 13 has a controller such as a CPU to execute an operation program stored in a memory (not illustrated) and controls the work setting system 1 according to the program.

The base material W5 such as a glass plate detached by the curing/detaching unit 9 is supplied to and reused by, for example, the coating unit 5. Flows of the first and second works W1 and W2 and product W indicated with arrows in FIG. 1 are achieved by transport robots (not illustrated) under the control of the control unit 13.

The work setting apparatus 7 will be explained in detail.

In the following explanation, an X-axis direction is one horizontal direction, a Y-axis direction is another horizontal direction orthogonal to the X-axis direction, and a Z-axis direction is a vertical direction orthogonal to the X- and Y-axis directions.

Figure 2:
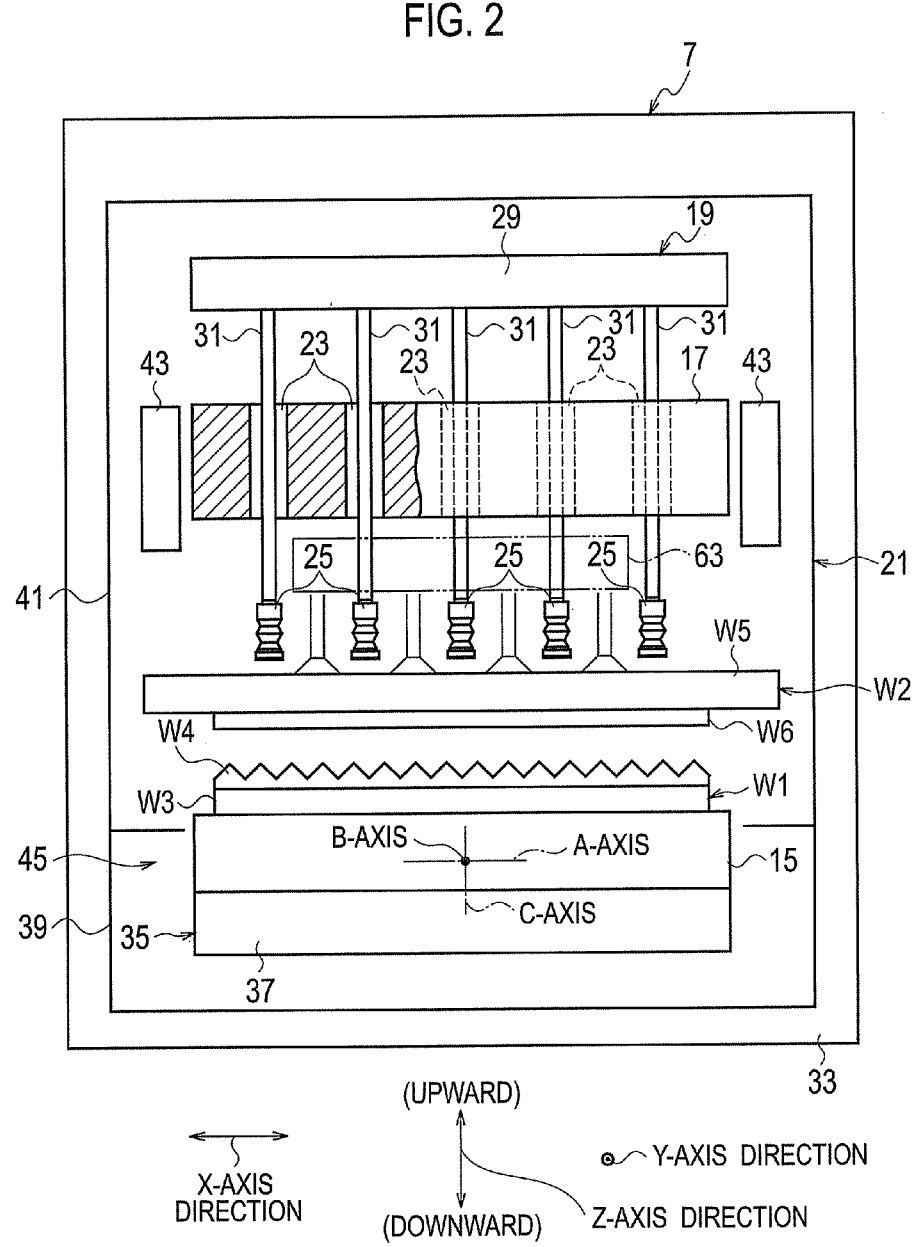
FIG. 2 illustrates the work setting apparatus of FIG. 1.

As illustrated in FIG. 2, the work setting apparatus 7 includes a first table (lower table) 15, a second table (upper table) 17, a work holding unit (glass holding unit) 19, and a vacuum atmosphere forming unit (vacuum chamber unit) 21.

The lower table 15 has a flat top face on which the plate-like first work W1 is set. Namely, the bottom face of the first work W1, which is downwardly oriented and is opposite to the top face where the protrusions W4 are formed, is set on the top face of the lower table 15 and is tightly attached thereto by a vacuum produced by a vacuum pump (not illustrated). In this way, the lower table 15 holds the first work W1.

The upper table 17 is arranged above and separated away from the lower table 15. The upper table 17 has a flat bottom face that is in parallel with and faced toward the top face of the lower table 15. While maintaining the parallel and facing state with respect to the top face of the lower table 15, the upper table 17 is moved toward and away from the lower table 15 in the Z-axis direction and positioned with respect to the lower table 15.

The upper table 17 is provided with a plurality of through holes 23 extending in the Z-axis direction. Each through hole 23 is formed through the upper table 17 in a direction orthogonal to the bottom face of the upper table 17. The through holes 23 are arranged in a matrix at predetermined intervals in the X- and Y-axis directions.

The work holding unit 19 has a plurality of work holders (glass holders) 25 to hold the second work W2. Each work holder 25 has a cylindrical main body 27 provided with an opening that is in parallel with and faced toward the top face of the lower table 15. While keeping the openings of the main bodies 27 being in parallel with and faced toward the top face of the lower table 15, the work holders 25 of the work holding unit 19 are moved independently of the upper table 17 in the Z-axis direction toward and away from the lower table 15 and upper table 17 and are positioned with respect to the lower table 15 and upper table 17.

The work holding unit 19 includes a work holder table 29. The work holder table 29 is arranged above the upper table 17 opposite to the lower table 15 with the upper table 17 interposed between the work holder table 29 and the lower table 15. The work holder table 29 is spaced away from the upper table 17. The lower table 15, upper table 17, and work holder table 29 are arranged in this order from bottom to top.

The work holder table 29 of the work holding unit 19 is integral with connecting members 31 that downwardly extend toward to upper table 17. A front end (lower end) of each connecting member 31 is integral with the work holder 25.

The work holder table 29 is moved and positioned in the Z-axis direction. Namely, the work holder table 29, connecting members 31, and work holders 25 are moved and positioned in the Z-axis direction with respect to the lower table 15 and upper table 17.

Figure 11A:
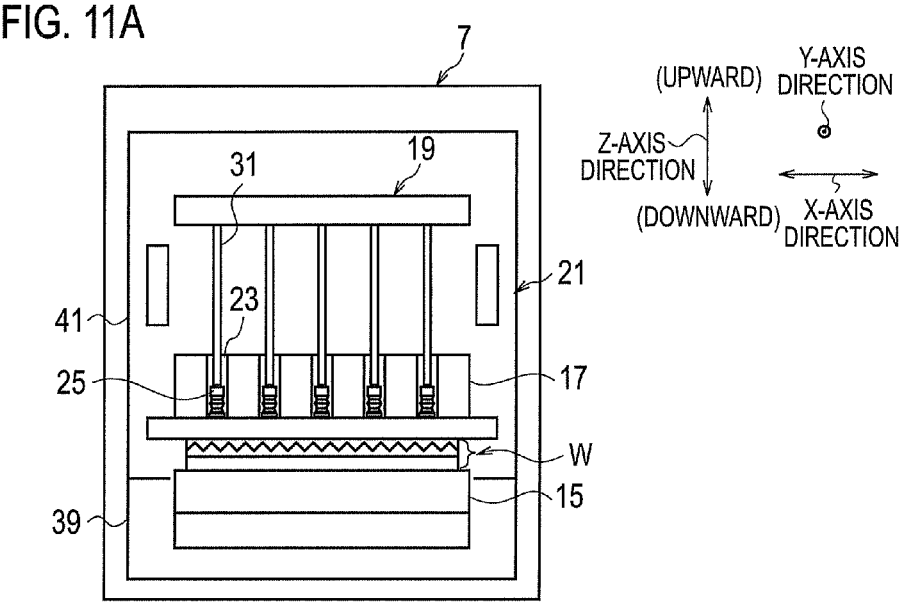
Figure 11B:
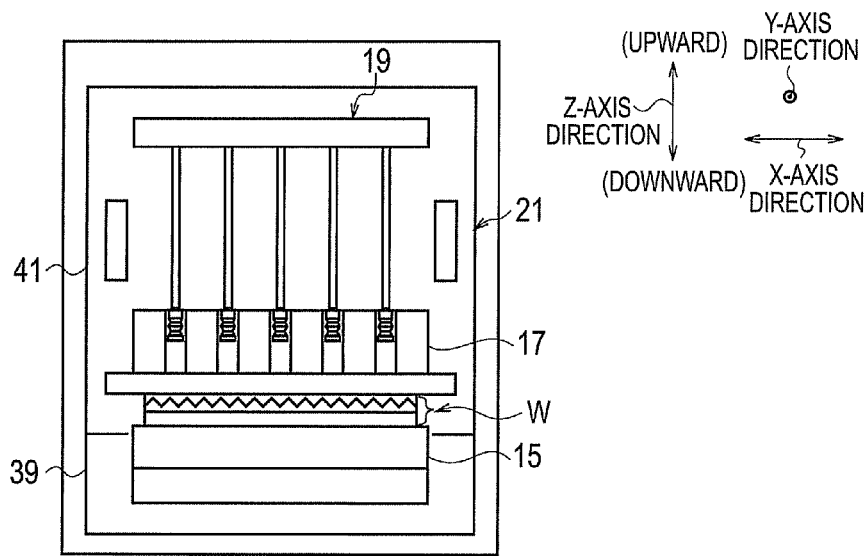

When the upper table 17 and work holder table 29 are spaced away from each other by a relatively long distance, the work holders 25 and front sections of the connecting members 31, or only the work holders 25 enter the through holes 23 of the upper table 17 and stay in the through holes 23 as illustrated in FIGS. 11A and 11B.

When the upper table 17 and work holder table 29 are brought close to each other as illustrated in FIGS. 9A, 9B, 10A, and 10B, only intermediate sections of the connecting members 31 are present in the through holes 23 of the upper table 17 and the work holders 25 are outside the through holes 23 between the lower table 15 and the upper table 17. The work holders 25 hold the second work W2.

Figure 10A:
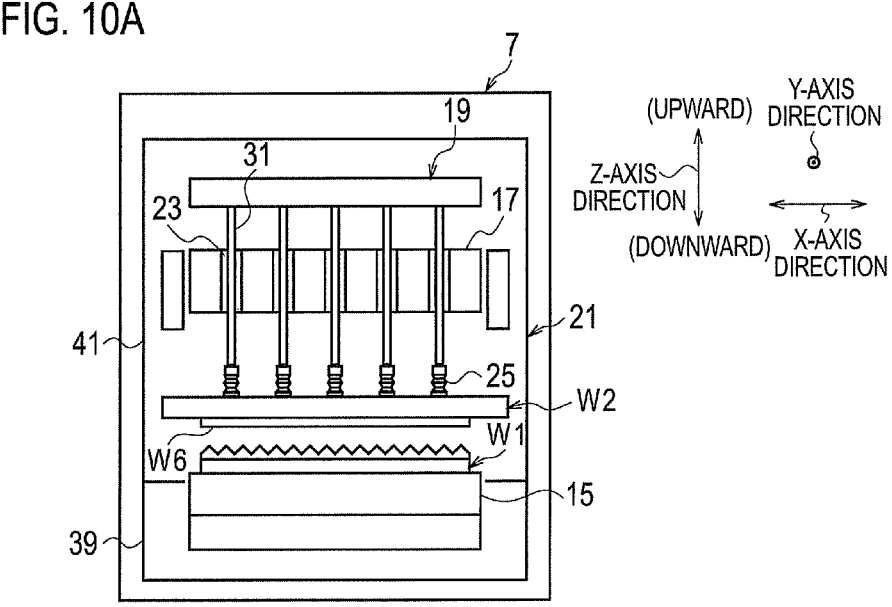

When held by the work holding unit 19, the second work W2 is present between the lower table 15 and the upper table 17 with the face of the second work W2 on which the membranous material W6 is arranged being on the lower side, i.e., on the side where the first work W1 is set on the lower table 15 and being substantially in parallel with and faced toward the top face of the first work W1 as illustrated in FIG. 10A.

The vacuum atmosphere forming unit 21 places the first and second works W1 and W2 in a vacuum atmosphere when the second work W2 held by the work holders 25 is set onto the first work W1 set on the lower table 15.

By virtue of the vacuum atmosphere forming unit 21, when the uncured membranous material W6 of the second work W2 comes in contact with the chevron protrusions W4 of the first work W1, air is prevented from entering into gaps between the first and second works W1 and W2 and forming bubbles in the gaps.

The work setting apparatus 7 includes a heater (not illustrated) that heats the first and second works W1 and W2, to increase viscosity of the uncured membranous material W6.

Operation of the work setting apparatus 7 carried out under the control of the control unit 13 will be explained. The operation starts from an initial state in which the upper table 17 is separated away from the lower table 15, the work holders 25 are present between the lower and upper tables 15 and 17, the first work W1 is set on the lower table 15, and the second work W2 is held by the work holders 25.

In this initial state, the vacuum atmosphere forming unit 21 forms a vacuum atmosphere. In the vacuum atmosphere, the work holders 25 are lowered toward the lower table 15, to set the second work W2 held by the work holders 25 onto the first work W1 set on the lower table 15. At this time, the upper table 17 is positioned above the first and second works W1 and W2 on the opposite side of the lower table 15.

The second work W2 held by the work holders 25 is brought into contact with the first work W1 set on the lower table 15 in the vacuum atmosphere. The vacuum atmosphere is maintained and the upper table 17 is lowered toward the lower table 15 to press the first and second works W1 and W2 between the upper and lower tables 17 and 15.

When the first and second works W1 and W2 are pressed, the heater is activated to heat the first and second works W1 and W2, thereby increasing viscosity of the uncured membranous material W6. The work holders 25 are lifted away from the lower table 15 and are removed from the second work W2.

The pressing of the first and second works W1 and W2 is continued for a predetermined time, and thereafter, the vacuum atmosphere forming unit 21 releases the vacuum state so that the first and second works W1 and W2 are exposed to, for example, atmospheric pressure. The upper table 17 is lifted away from the lower table 15, to separate the upper table 17 from the second work W2. The lower table 15 stops the vacuum suction, thereby releasing, from the lower table 15, the first work W1 with the second work W2 set on it.

Alternative operation of the work setting apparatus 7 will be explained.

From the above-mentioned initial state, the work holders 25 are lowered until a predetermined short distance is established between the first work W1 set on the lower table 15 and the second work W2 held by the work holders 25. The predetermined short distance is so determined that the first and second works W1 and W2 are nearly in contact with each other but are still separated away from each other.

The vacuum atmosphere forming unit 21 generates a vacuum atmosphere condition. In the vacuum atmosphere, the work holders 25 release the second work W2 so that the second work W2 freely falls onto the first work W1 and the uncured membranous material W6 of the second work W2 comes in contact with the first work W1, thereby setting the second work W2 onto the first work W1 set on the lower table 15. Releasing the second work W2 from the work holders 25 is carried out by lowering the upper table 17 so that the upper table 17 downwardly pushes the second work W2.

The vacuum atmosphere in which the second work W2 has been set onto the first work W1 is maintained and the upper table 17 is further lowered to press the first and second works W1 and W2 between the upper and lower tables 17 and 15 for a predetermined time.

During the pressing of the first and second works W1 and W2, the heater is activated to heat the first and second works W1 and W2, to increase viscosity of the uncured membranous material W6. At this time, the work holders 25 are lifted away from the second work W2.

After elapsing the predetermined time for pressing the first and second works W1 and W2, the vacuum atmosphere forming unit 21 cancels the vacuum atmosphere, the upper table 17 is lifted to separate the upper table 17 from the second work W2, and the first work W1 on which the second work W2 is set is released from the lower table 15.

The timing of generating the vacuum atmosphere may properly be changed. For example, the vacuum atmosphere may be generated in the initial state. Thereafter, the work holders 25 are lowered to establish the predetermined short distance between the first work W1 set on the lower table 15 and the second work W2 held by the work holders 25.

Still another alternative operation of the work setting apparatus 7 will be explained.

From the above-mentioned initial state, a table positioning unit 45 is driven to correct a positional error between the first work W1 set on the lower table 15 and the second work W2 held by the work holders 25. The details of the positional error correction carried out by the table positioning unit 45 will be explained later.

After the positional error correction, the vacuum atmosphere forming unit 21 forms a vacuum atmosphere. In the vacuum atmosphere, the work holders 25 are lowered toward the lower table 15 until the uncured membranous material W6 of the second work W2 comes in contact with the first work W1 and the second work W2 is set onto the first work W1.

The vacuum atmosphere is maintained and the upper table 17 is lowered toward the lower table 15, thereby pressing the first and second works W1 and W2 between the upper and lower tables 17 and 15 for a predetermined time.

During the pressing of the first and second works W1 and W2, the heater is activated to heat the first and second works W1 and W2 and increase viscosity of the uncured membranous material W6.

After elapsing the predetermined time of pressing the first and second works W1 and W2, the upper table 17 is lifted away from the lower table 15, thereby separating the upper table 17 from the second work W2. The table positioning unit 45 is driven to slightly vibrate the first and second works W1 and W2 set on the lower table 15. Namely, an XYC table (lower table) 15 is slightly moved back and forth with respect to an XYC bed 37, thereby slightly vibrating the first and second works W1 and W2 on the lower table 15. At this time, the work holders 25 are lifted away from the lower table 15, to separate the work holders 25 from the second work W2. Instead of or in addition to slightly vibrating the first and second works W1 and W2 by the lower table 15, the work holders 25 may slightly be vibrated by a vibrator (not illustrated). In this case, the vibration direction may be at least one of the X-, Y-, and Z-axis directions.

Instead of or in addition to the above-mentioned vibration, compressed air may be fed into the work holders 25 when separating the work holders 25 from the second work W2.

The work setting apparatus 7 will be explained in more detail with reference to FIG. 2 and other drawings.

The work setting apparatus 7 has a frame 33. At a lower part of the frame 33, there is an XYC stage 35. The XYC stage 35 includes the XYC bed 37 and the XYC table (lower table) 15.

The XYC bed 37 is integral with the frame 33. The lower table 15 is arranged on and supported by the XYC bed 37. The lower table 15 is supported by the XYC bed 37 through linear guide bearings, bearings, and the like (not illustrated). Under the control of the control unit 13, the lower table 15 is driven by an actuator (not illustrated) such as a servomotor and a linear motor so that the lower table 15 is moved and positioned in the X- and Y-axis directions and is turned and positioned around a C-axis. The C-axis passes through the center of the XYC bed 37 and extends in the Z-axis direction.

In addition to the X- and Y-axis directions and around the C-axis, the lower table (XYC table) 15 may be turned and positioned around A- and B-axes on the XYC bed 37. The A-axis passes through the center of the XYC stage 35 and extends in the X-axis direction and the B-axis passes through the center of the XYC stage 35 and extends in the Y-axis direction.

The first work W1 is carried by a robot (not illustrated) to a predetermined position on the lower table 15, is vacuum-drawn by a vacuum pump (not illustrated), and is tightly set on the lower table 15 at the predetermined position. The top face of the lower table 15 has projections (not illustrated) and the first work W1 is brought into contact with the projections so that the first work W1 is correctly positioned and set on the lower table 15 in the X- and Y-axis directions and around the C-axis.

The upper table 17 arranged above the lower table 15 is supported by the frame 33 through linear guide bearings (not illustrated). Under the control of the control unit 13, the upper table 17 is moved and positioned in the Z-axis direction by an actuator (not illustrated) such as a servomotor and a linear motor.

The work holding unit 19 includes, as mentioned above, the work holder table 29, connecting members 31, and work holders 25. The work holder table 29 is above and away from the upper table 17 and is supported by the frame 33 through linear guide bearings (not illustrated). Under the control of the control unit 13, the work holder table 29 is moved and positioned in the Z-axis direction by an actuator (not illustrated) such as a servomotor and a linear motor.

In this way, the upper table 17 and work holding unit 19 are individually moved and positioned in the X-, Y-, and Z-axis directions and around the C-axis with respect to the lower table 15.

Although the work holder table 29 (work holding unit 19) is supported by the frame 33 according to the embodiment, the work holder table 29 may be supported through linear guide bearings (not illustrated) by the upper table 17 so that the work holder table 29 is moved and positioned in the Z-axis direction with respect to the upper table 17.

The vacuum atmosphere forming unit 21 includes a lower shell 39, an upper shell 41, and a vacuum pump (not illustrated). The lower shell 39 is integral with a lower part of the frame 33. The upper shell 41 is supported through linear guide bearings (not illustrated) by an upper part of the frame 33. The upper shell 41 is moved in the Z-axis direction by an actuator (not illustrated) such as a pneumatic cylinder.

When positioned at a lower stroke end, the upper shell 41 is in contact with the lower shell 39 to define a closed space. At this time, the lower and upper shells 39 and 41 form a vacuum chamber. The closed space accommodates the lower table 15, upper table 17, and work holding unit 19.

The closed space defined by the lower and upper shells 39 and 41 is vacuumed to create a vacuum atmosphere around the first work W1 set on the lower table 15 and the second work W2 held by the work holding unit 19 or set on the first work W1.

When positioned at an upper stroke end, the upper shell 41 is spaced away from the lower shell 39 to form an opening of the vacuum chamber. Through the opening, the first and second works W1 and W2 are fed from the front stocker 3 and coating unit 5 to the lower table 15 and work holding unit 19 and the first and second works W1 and W2 solidified into the product W are transferred from the work setting apparatus 7 to the curing/detaching unit 9.

The heater of the work setting apparatus 7 is installed on at least one of the upper table 17 and lower table 15, to heat the first and second works W1 and W2.

The work setting apparatus 7 also includes a camera 43 to photograph eyemarks (not illustrated) put on the base material W5 of the second work W2. The photographed eyemarks are used to detect positional errors of the second work W2 in the X- and Y-axis directions and around the C-axis with respect to the first work W1 set on the lower table 15.

The measured positional errors are corrected by the table positioning unit 45. Namely, the lower table (XYC table) 15 is moved and turned with respect to the XYC bed 37, to eliminate the positional errors, so that the second work W2 is correctly positioned with respect to the first work W1 set on the lower table 15.

The camera 43 may photograph eyemarks put on the base material W3 of the first work W1, to find positional errors of the first work W1 with respect to the lower table 15 on which the first work W1 is set.

According to the detected positional errors of the first and second works W1 and W2, the second work W2 may correctly be positioned with respect to the first work W1.

The work holders 25 will be explained in detail.

The work holders 25 engage with the top face of the base material W5 of the second work W2 at predetermined positions thereof, thereby holding the second work W2.

Figure 5A:
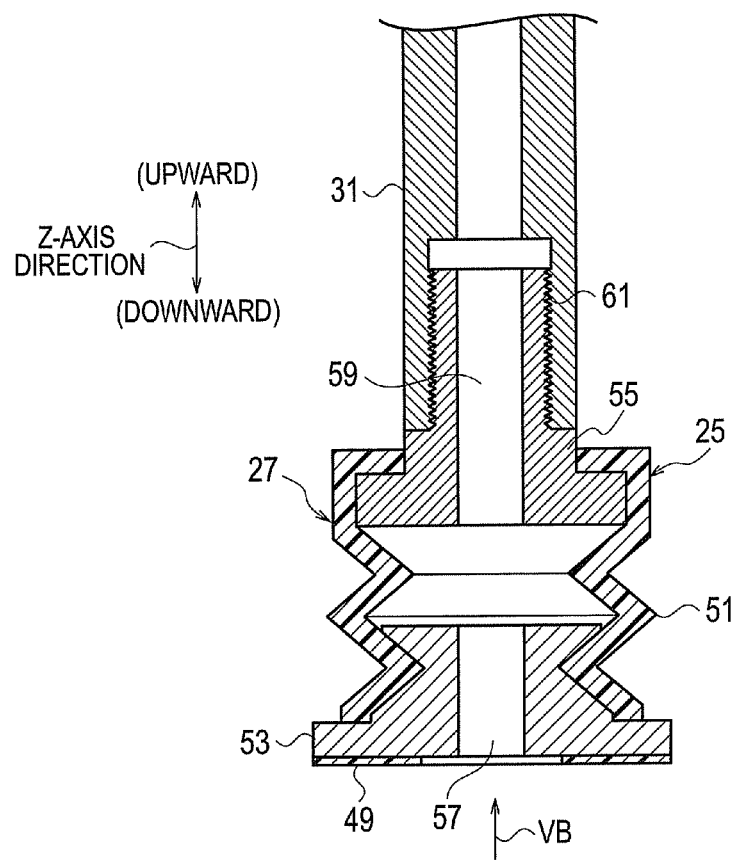
Figure 5B:
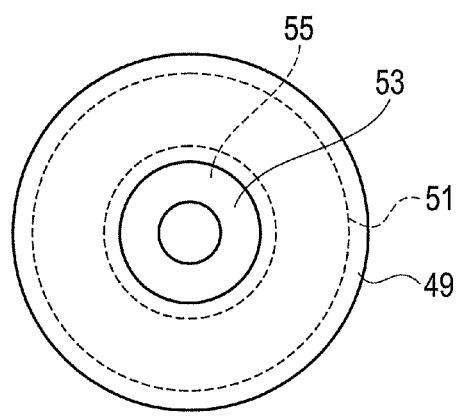

As illustrated in FIGS. 5A and 5B, each work holder 25 has a cylindrical main body 27 and an adhesive 49 arranged at an opening of the main body 27.

The adhesive 49 is a film that covers the periphery of the opening of the main body 27 wherein the opening is present at an axial end of the main body 27.

To hold the second work W2, the adhesive 49 comes in contact with the flat surface of the second work W2 and the opening of the main body 27 faces the second work W2.

When the adhesive 49 of each work holder 25 comes in contact with the flat surface of the second work W2, i.e. the surface of the base material W5 opposite to the membranous material W6, the inside of the main body 27 is put in a vacuum state or a low-pressure state lower than atmospheric pressure, thereby holding the second work W2.

When the vacuum state inside the main body 27 is released, or when the inside of the main body 27 restores atmospheric pressure, or when the work holder 25 and the second work W2 held by the work holder 25 are placed in a vacuum atmosphere, at least the adhesive force of the adhesive 49 can support the weight of the second work W2 and holds the second work W2.

The adhesive 49 is, for example, a silicon-based adhesive that is not sticky, is substantially not transferred to the second work W2 when the second work W2 is released from the work holder 25, and little deteriorates adhesive capacity after repetitive use.

In each work holder 25, the cylindrical main body 27 at least partly includes a cylindrical elastic member 51.

More precisely, the main body 27 has the cylindrical elastic member 51 such as a rubber bellows-like vacuum pad 51, a work-side member 53 made of rigid material such as metal and hard synthetic resin, and a connection-side member 55 made of rigid material such as metal and hard synthetic resin.

The work-side member 53 has a flat surface at a first axial end thereof. A through hole 57 is formed at the center of the flat surface. The through hole 57 is formed orthogonal to the flat surface, i.e., in an axial direction of the work-side member 53, to make the work-side member 53 cylindrical or annular.

The center axis of the work-side member 53, i.e., the center axis of the through hole 57 agrees with the center axis of the elastic member 51, i.e., the center axis of a through hole defined inside the elastic member 51. A second axial end of the work-side member 53 integrally engages with a first axial end of the cylindrical elastic member 51.

The connection-side member 55 has a central through hole 59 and has a shape of a cylinder or a ring. The center axis of the connection-side member 55, i.e., the center axis of the through hole 59 agrees with the center axis of the cylindrical elastic member 51, i.e., the center axis of the through hole of the elastic member 51. A first axial end of the connection-side member 55 integrally engages with a second axial end of the elastic member 51 at a position away from the work-side member 53.

The adhesive 49 is an annular film applied to the end face of the work-side member 53 opposite to the elastic member 51.

A second axial end (upper side of FIG. 5A) of the connection-side member 55 opposite to the elastic member 51 has a male thread 61 through which the through hole 59 extends.

The male thread 61 of the connection-side member 55 is screwed into the cylindrical connecting member 31, thereby integrating the work holder 25 with the connecting member 31. The center axis of the work holder 25 (including the cylindrical elastic member 51, work-side member 53, and connection-side member 55) joined to the connecting member 31 extends in the Z-axis direction.

Through the work holder table 29 and the inner space of each connecting member 31, a vacuum pump (not illustrated) vacuums an inner space of each work holder 25 to draw the second work W2 toward the work holders 25.

It is possible to employ a configuration to supply pressurized air into the inner space of each work holder 25. Supplying pressurized air into each work holder 25 results in removing the work holder 25 from the second work W2.

In FIGS. 5A and 5B, the adhesive 49 is applied in a ring shape along the annular opening of the work-side member 53. Instead, the adhesive 49 may be applied entirely over the annular opening of the work-side member 53, or annularly along an inner circumference of the opening, or in multiple rings along the opening.

Figure 6A:
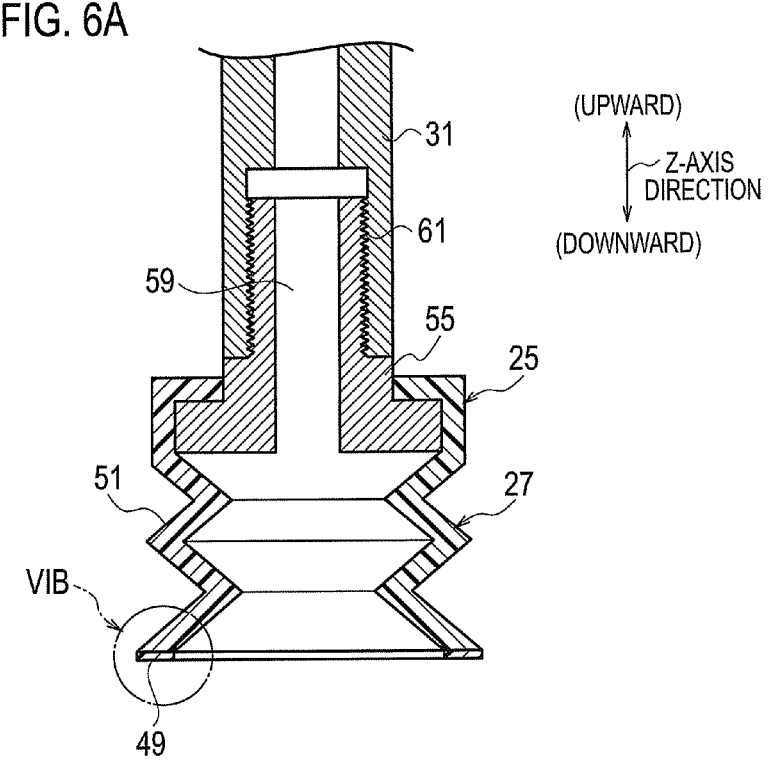
Figure 6B:
Figure 6C:
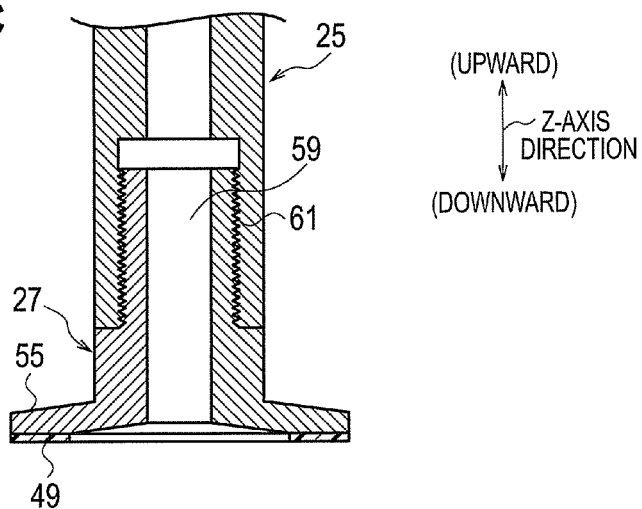

The work holder 25 is modifiable as illustrated in FIGS. 6A, 6B, 6C.

In FIG. 6A, the work-side member 53 of FIG. 5A is omitted and the adhesive 49 is directly applied to an opening of the cylindrical elastic member 51. Namely, the cylindrical main body 27 of the work holder 25 of FIG. 6A includes the cylindrical elastic member 51 and rigid connection-side member 55. The connection-side member 55 is annular with the central through hole 59. The center axis of the connection-side member 55 agrees with the center axis of the cylindrical elastic member 51. The first axial end of the connection-side member 55 integrally engages with the second axial end of the elastic member 51. The adhesive 49 is an annular film applied to the first axial end of the elastic member 51.

In FIG. 6B, the opening of the cylindrical elastic member 51 is not flat but has a truncated conical shape. In FIG. 6C, the work-side member 53 and cylindrical elastic member 51 of FIG. 5A are omitted and the adhesive 49 is directly applied to an opening of the connection-side member 55. Although not illustrated, the work holder 25 may include only the cylindrical elastic member 51 and adhesive 49.

Operation of the work setting apparatus 7 will be explained with reference to FIGS. 7 to 14B.

In FIG. 7, in Step S1, an initial state is established where the upper table 17 is lifted away from the lower table 15, the work holding unit 19 is lifted with the work holders 25 being positioned between the lower and upper tables 15 and 17, the first work W1 is not set on the lower table 15, the second work W2 is not held by the work holding unit 19, the vacuum atmosphere forming unit 21 forms no vacuum atmosphere, the heater is ON, and the XYC table (lower table) 15 is at a predetermined default position with respect to the XYC bed 37.

Figure 9A:
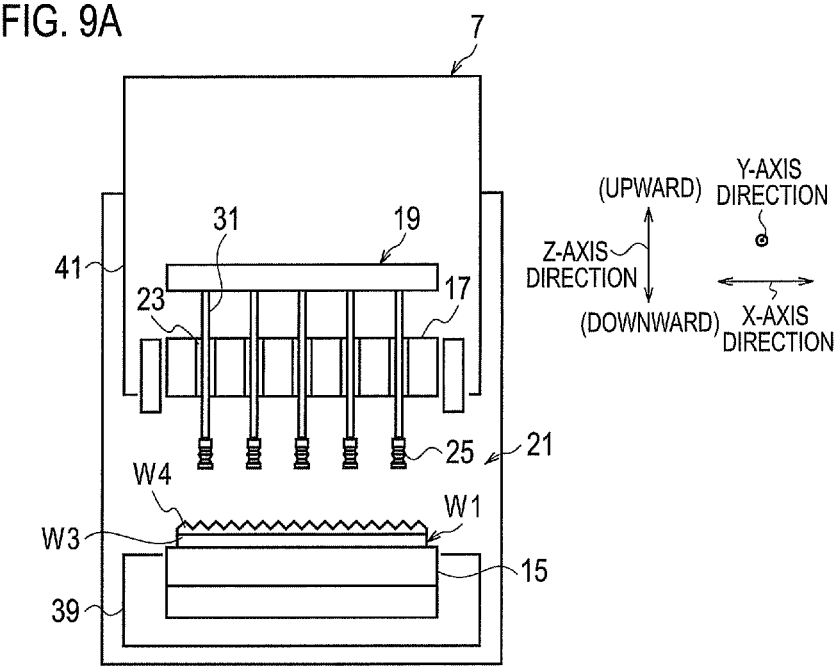
FIGS. 9A, 9B, 10A, 10B, 11A, 11B, 12A, 12B, 13A, 13B, 14A, and 14B illustrate operation of the work setting apparatus of FIG. 2 in accordance, with the flowcharts of FIGS. 7 and 8.
Figure 9B:
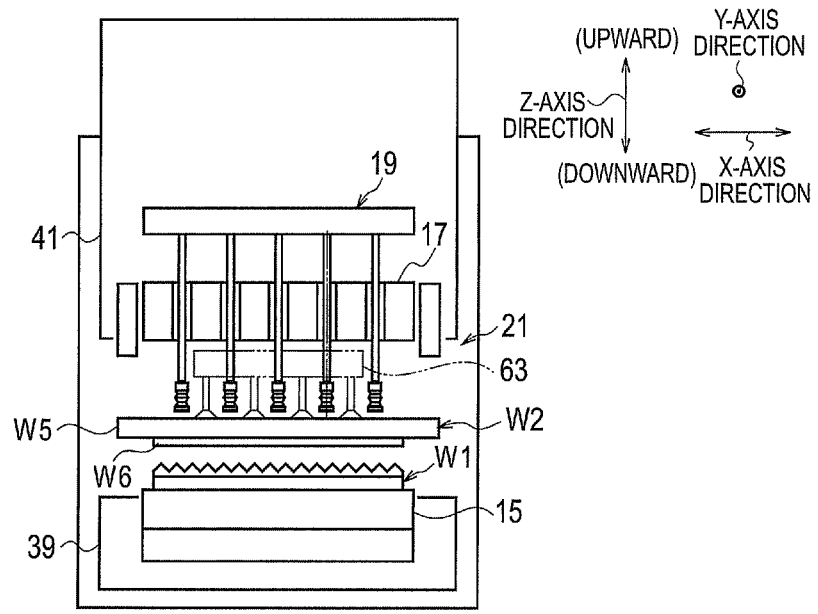

As illustrated in FIGS. 9A and 9B, in Step S3, the control unit 13 is instructed to carry the first work W1 by a robot (not illustrated), set the same on the lower table 15 (Setting process of W1), and carry the second work W2 by a work carrier 63 associated with a robot (not illustrated) into the work holders 25.

As illustrated in FIG. 10A, in Step S5, the work holders 25 of the work holding unit 19 are lowered to hold the second work W2 with the use of vacuum suction and the adhesive 49 (Holding process of W2). The second work W2 includes the plate-like base material W5 and the uncured membranous material W6 formed on one face of the base material W5. The other face of the base material W5 opposite to the uncured membranous material W6 is held by the work holders 25 with the use of vacuum suction and the adhesive 49. Then, the work carrier 63 is withdrawn from the work setting apparatus 7 in Step S7.

The uncured membranous material W6 on the base material W5 of the second work W2 is formed in advance by the coating unit 5 illustrated in FIG. 1.

The initial state established in Step S1 may be altered so that the first work W1 is set on the lower table 15 and the second work W2 is held by the work holders 25. The work carrier 63 that carries the second work W2 to the work holders 25 is installed at a front end of an arm of a robot as illustrated in FIGS. 2 and 9B and is configured to hold the second work W2 by vacuum suction.

After the first work W1 is set on the lower table 15, the second work W2 is held by the work holders 25, and the robot (work carrier 63) is withdrawn, in Step S9, a vacuum atmosphere is formed around the first work W1 set on the lower table 15 and the second work W2 held by the work holders 25, as illustrated in FIG. 10A.

In Step S11, a positional error of the second work W2 with respect to the first work W1 is measured by use of the camera 43 and determines if the measured positional error is within an allowable range.

If the measured positional error is out of the allowable range, in Step S13, the XYC table 15 are properly moved and positioned to correctly position the second work W2 with respect to the first work W1. Thereafter, Step S15 is carried out. If the measured positional error is within the allowable range, Step S13 is bypassed and Step S15 is carried out.

Step S15 determines whether or not the work holding unit 19 must release and drop the second work W2. This determination is made according to information that is beforehand inputted into the control unit 13 through an input unit (not illustrated) such as a touch panel.

Figure 10B:
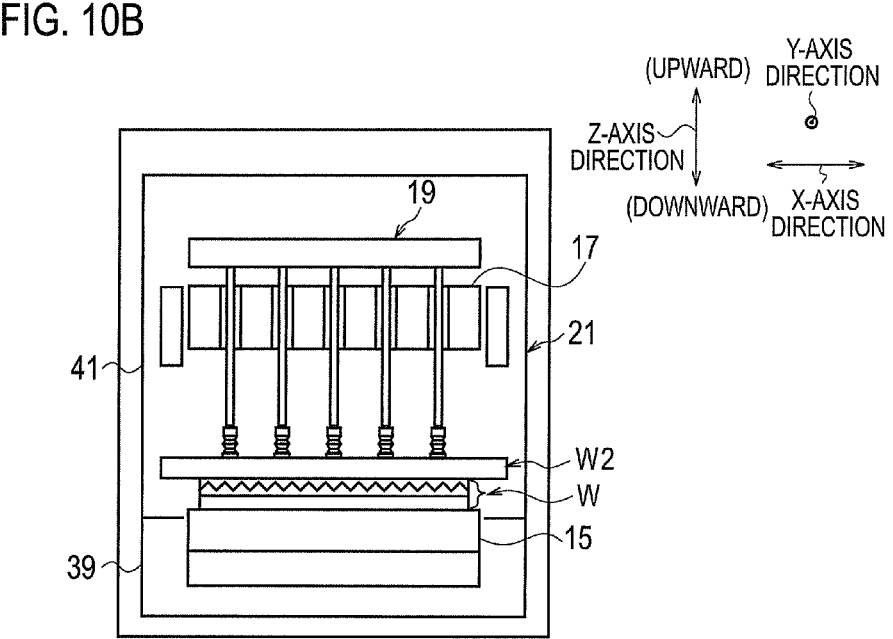

If Step S15 determines that the work holding unit 19 must not release the second work W2, Step S17 keeps the vacuumed state and lowers the work holders 25 toward the first work W1 so that the uncured membranous material W6 of the second work W2 comes in contact with the first work W1, thereby setting the second work W2 onto the first work W1 as illustrated in FIG. 10B.

In Step S19, the vacuumed state is kept and the upper table 17 that is positioned above the work holders 25 and second work W2 is lowered toward the second work W2 so that the work holders 25 enter the through holes 23 of the upper table 17 and the upper table 17 presses the first and second works W1 and W2 between the upper and lower tables 17 and 15 as illustrated in FIG. 11A. The pressing of the first and second works W1 and W2 is continued for a predetermined time. At this time, the heater heats the first and second works W1 and W2 to increase viscosity of the uncured membranous material W6.

Step S21 determines whether or not the XYC table 15 must be driven (vibrated) when the second work W2 is released from the work holding unit 19. This determination is made according to information that is beforehand inputted into the control unit 13 through the input unit (not illustrated) such as a touch panel.

If Step S21 determines that the XYC table 15 must not be driven, Step S23 keeps the pressing of the first and second works W1 and W2 and lifts the work holders 25 so that the work holders 25 further enter the through holes 23 of the upper table 17 away from the second work W2 as illustrated in FIG. 11B.

Figure 12A:
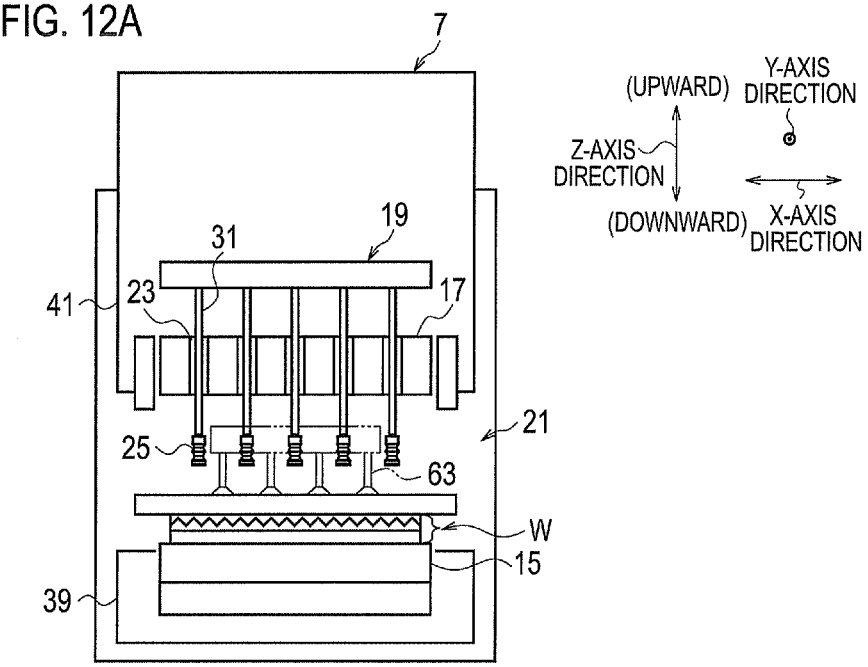

Step S25 determines if a predetermined time has passed after the separation of the work holders 25 from the second work W2 and the pressing of the first and second works W1 and W2. If the predetermined time has passed, Step S27 lifts the upper table 17 away from the second work W2, and thereafter, negates the vacuum atmosphere as illustrated in FIG. 12A.

When the upper table 17 is lifted away from the second work W2 in Step S27, there is a period during which the work holders 25 are present in the through holes 23 of the upper table 17. From when the upper table 17 starts to be lifted away from the second work W2 until when a distance between the upper table 17 and the second work W2 reaches a predetermined value, the work holders 25 are present in the through holes 23 of the upper table 17. Once the distance between the upper table 17 and the second work W2 exceeds the predetermined value, the work holders 25 come out of the through holes 23 of the upper table 17 and are positioned between the upper table 17 and the first and second works W1 and W2.

Figure 12B:
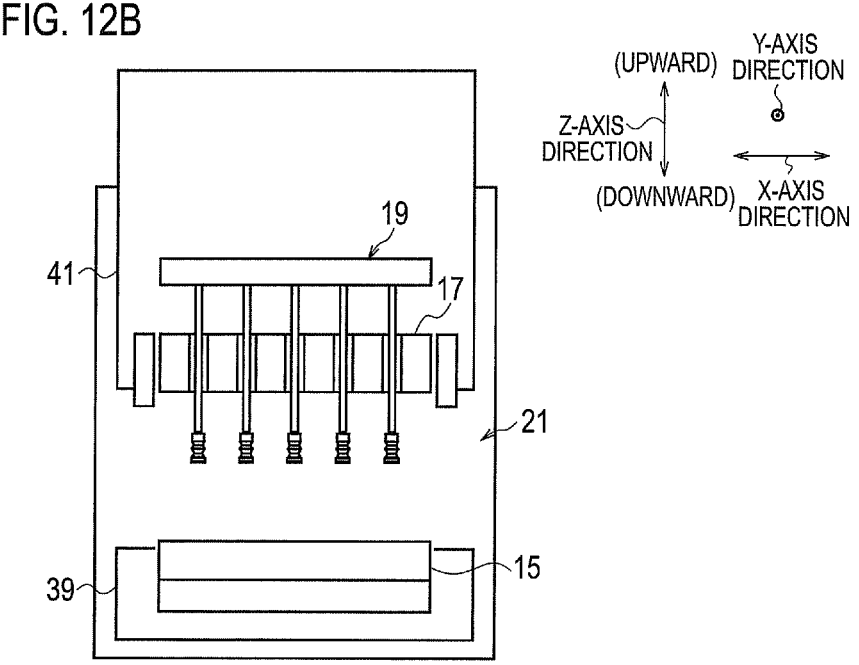

In Step S29, the vacuum suction of the first work W1 by the lower table 15 is stopped, the combined first and second works W1 and W2 is taken out with the use of the work carrier 63, and the lower table 15 is returned to the default position as illustrated in FIG. 12B.

The combined first and second works W1 and W2 taken out of the lower table 15 are irradiated with ultraviolet rays in the curing/detaching unit 9, to cure the uncured membranous material W6. Namely, the upper table 17 is separated away from the second work W2 in Step S27, the vacuum atmosphere is cancelled in Step S27, the first and second works W1 and W2 that are integrated together are carried from the lower table 15 to the curing/detaching unit 9 in Step S29, and the uncured membranous material W6 of the integrated first and second works W1 and W2 is cured in the curing/detaching unit 9.

Figure 3A:
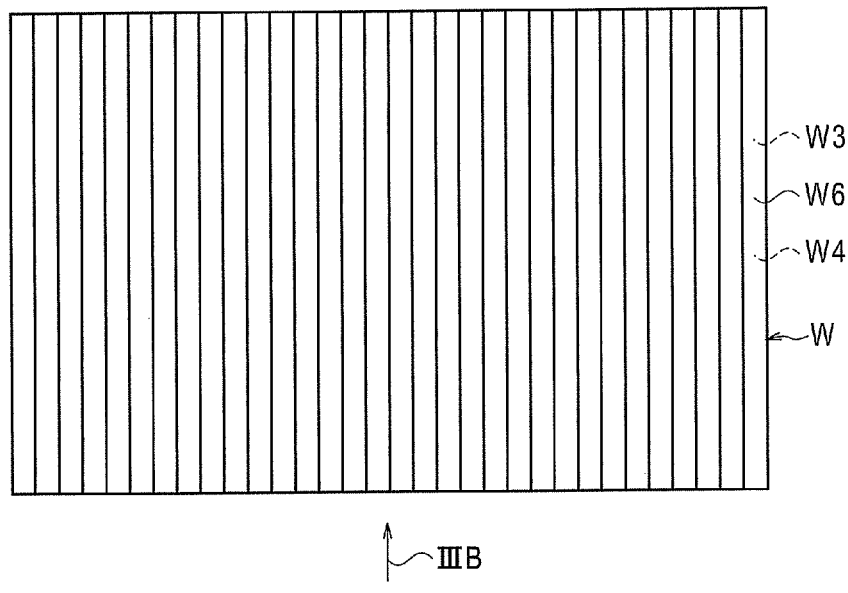
Figure 3B:
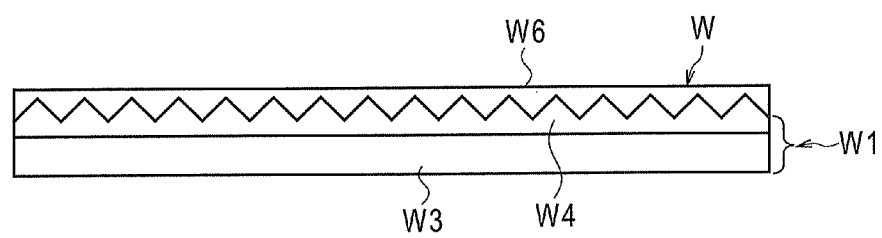
Figure 4A:
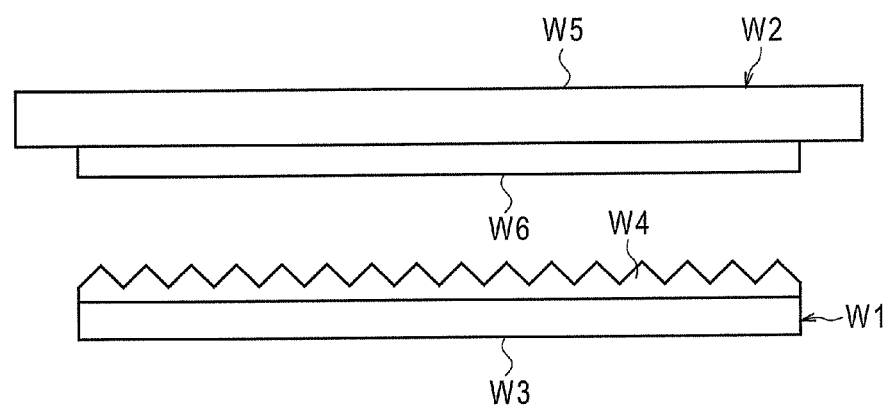
FIGS. 4A and 4B roughly illustrate steps of forming the product illustrated in FIGS. 3A and 3B.
Figure 4B:
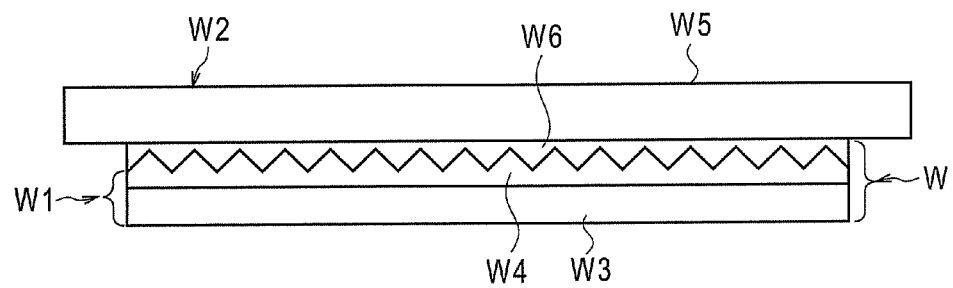

After curing the membranous material W6, the curing/detaching apparatus 9 detaches the base material W5 from the combined first and second works W1 and W2, thereby providing the product W illustrated in FIGS. 3A and 3B.

Figure 13A:
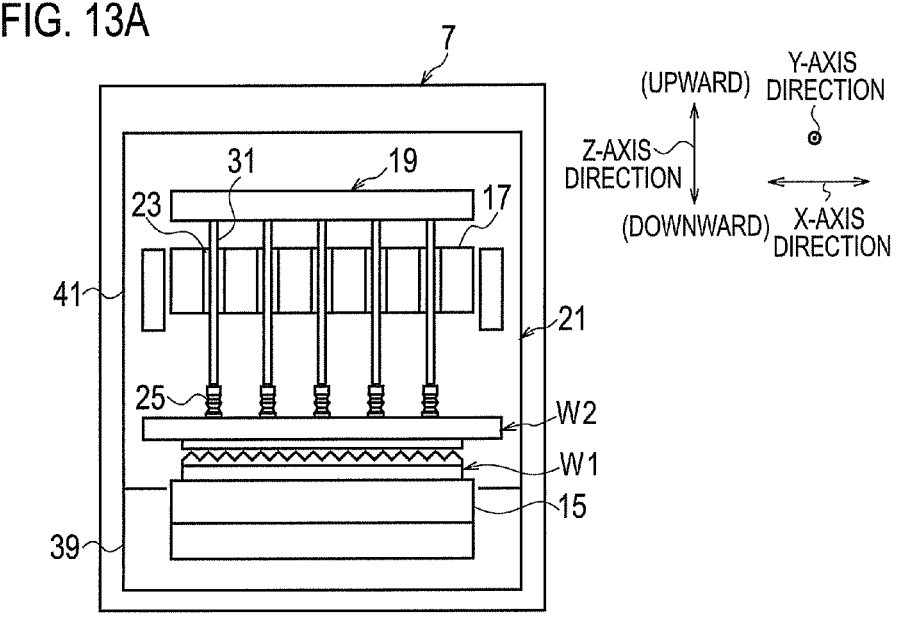

Returning to FIG. 7, if Step S15 determines that the work holding unit 19 must release the second work W2, in Step S31, the work holders 25 is lowered until a predetermined short distance is established between the first and second works W1 and W2 as illustrated in FIG. 13A.

Figure 13B:
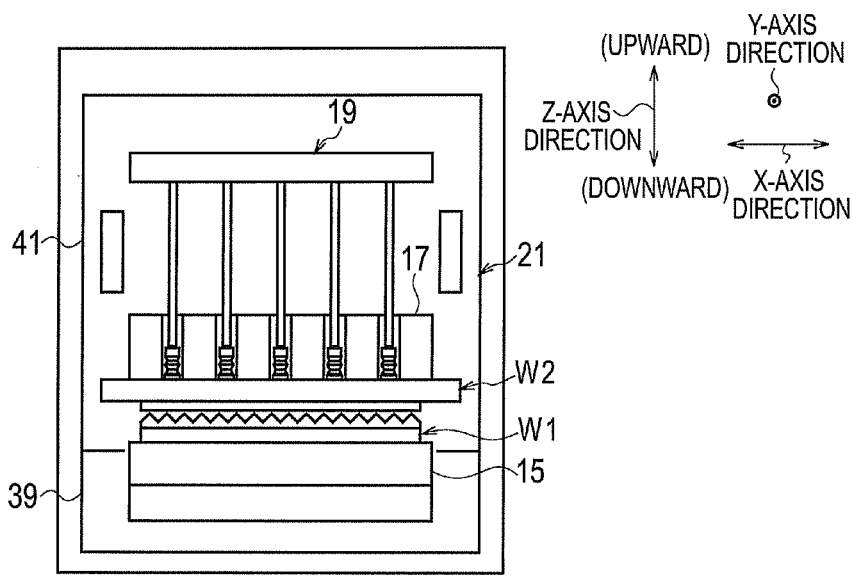

Step S33 maintains the vacuumed state formed in Step S9 and lowers the upper table 17 so that the second work W2 drops from the work holders 25, the uncured membranous material W6 of the second work W2 comes in contact with the first work W1, and the second work W2 is set onto the first work W1 as illustrated in FIG. 13B. The second work W2 free-falls from the work holders 25 when the upper table 17 is lowered and downwardly pushes the second work W2.

Figure 14A:
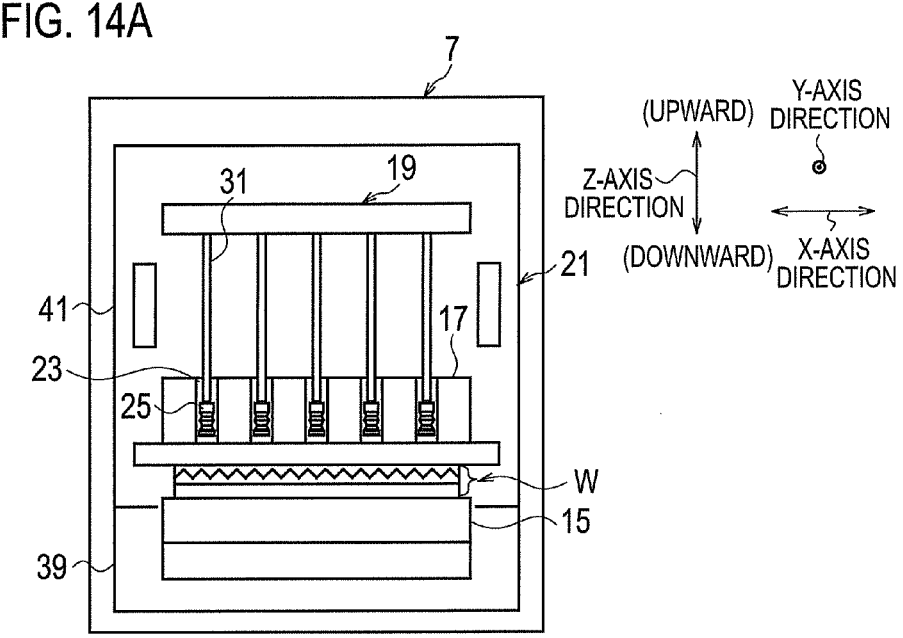

After the second work W2 is set onto the first work W1, in Step S35, the upper table 17 is further lowered to press the first and second works W1 and W2 between the upper and lower tables 17 and 15 as illustrated in FIG. 14A. The pressing of the first and second works W1 and W2 is carried out for a predetermined time, and at this time, the heater heats the first and second works W1 and W2 to increase viscosity of the uncured membranous material W6. Thereafter, Step S21 is carried out.

When Step S15 determines that the work holding unit 19 must release the second work W2, the generation of a vacuum atmosphere may be shifted behind. Namely, after the second work W2 is lowered in Step S31, the first work W1 set on the lower table 15 and the second work W2 held by the work holders 25 may be placed in a vacuum atmosphere.

Heating the first and second works W1 and W2 and increasing viscosity of the uncured membranous material W6 may be carried out at least during the period in which the first and second works W1 and W2 are pressed in step S19 or S35.

Figure 8:
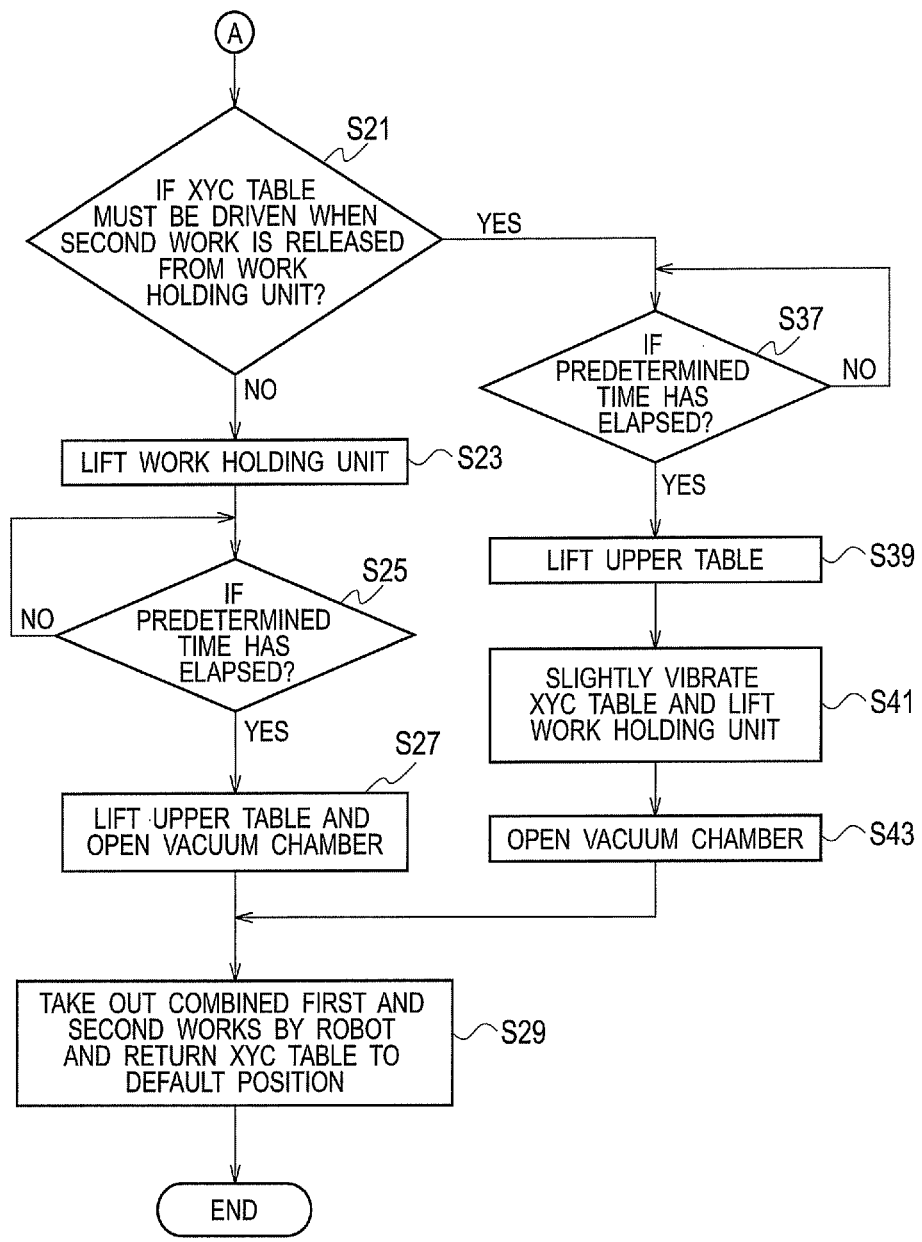
Figure 14B:
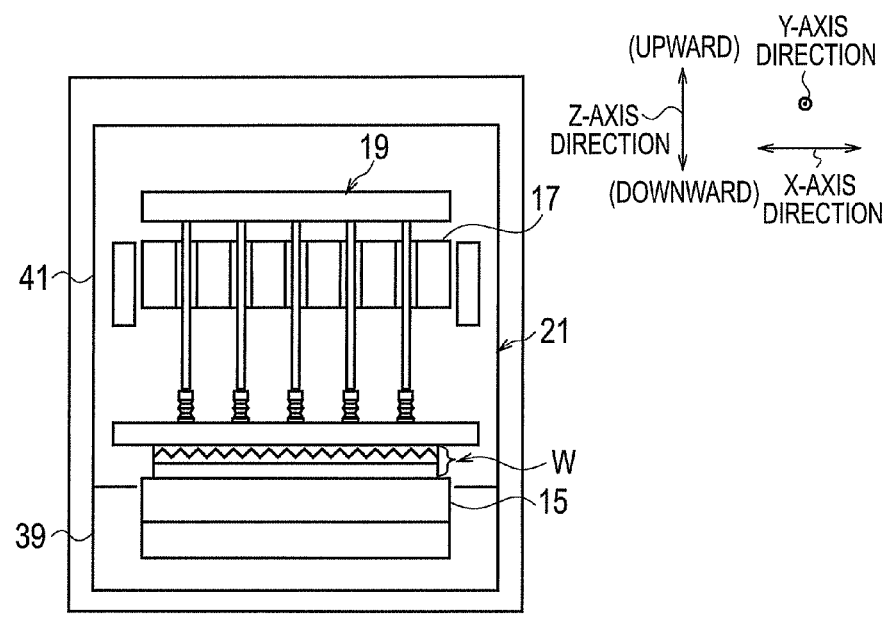

If step S21 of FIG. 8 determines that the XYC table 15 must be driven, step S37 determines whether or not the first and second works W1 and W2 have been pressed by the lower and upper tables 15 and 17 for a predetermined time. After the predetermined time, the upper table 17 is lifted away from the second work W2 (Step S39) as illustrated in FIG. 14B.

After the upper table 17 is separated away from the second work W2 in Step S39, in Step S41, the XYC table 15 is driven to slightly vibrate the first and second works W1 and W2 and lifts the work holders 25 away from the second work W2.

Instead of or in addition to driving the XYC table 15 to slightly vibrate the first and second works W1 and W2 set on the lower table 15 in Step S41, compressed air may be supplied into the work holders 25 and the work holders 25 is lifted away from the second work W2.

Vibrating the first and second works W1 and W2 is carried out at least in one of the X- and Y-axis directions, or around one of the C-, A-, and B-axes. Without vibrating the first and second works W1 and W2, compressed air may be supplied into the work holders 25 when lifting the work holders 25 away from the second work W2.

After the upper table 17 is separated from the second work W2 in step S39, or after the work holders 25 are separated from the second work W2 in step S41, the vacuum atmosphere is canceled (Step S43) and advanced to Step S29.

As mentioned above, each work holder 25 according to the embodiment of the present invention holds the second work W2 with the use of an adhesive in addition to vacuum suction, and therefore, is capable of holding the second work W2 even in a vacuum atmosphere. In the air, the second work W2 is required to be quickly held and transferred. For this, the work holder 25 is capable of strongly holding the second work W2 without dropping the same.

If vacuum suction is additionally used in the air, the adhesive 49 of each work holder 25 more strongly adheres to the second work W2 compared to when using the adhesive 49 alone. With the adhesive and vacuum suction, the work holders 25 can surely hold the second work W2 even in a vacuum.

Pressurized air may be supplied into the main body 27 of each work holder 25 that is holding the second work W2 when separating the adhesive 49 from the second work W2. This easily removes the second work W2 from each work holder 25 whose adhesive 49 is adhering to the second work W2.

According to the embodiment, the cylindrical main body 27 of each work holder 25 partly has the cylindrical elastic member 51. Even if the top face of the second work W2 and the annular bottom face of the work holder 25 on which the adhesive 49 is arranged are not in parallel with each other, the elastic member 51 elastically deforms so that the bottom face of the work holder 25 aligns with and becomes in parallel with the top face of the second work W2, thereby surely holding the second work W2.

According to the embodiment, the work holders 25 each can surely hold the second work W2. Even if the heights or vertical positions of the bottom faces of the work holders 25 slightly differ from one another, the cylindrical elastic members 51 of the work holders 25 properly deform in the Z-axis direction so that every work holder 25 comes in contact with the second work W2 and surely holds the second work W2.

According to the embodiment, the adhesive 49 is applied as an annular film to the flat face of the work-side member 53 of each work holder 25. If the adhesive 49 deteriorates after use, the work-side member 53 with the adhesive 49 may be replaced with a new one. This simplifies the maintenance of each work holder 25.

According to the embodiment, the connection-side member 55 of each work holder 25 is provided with the male thread 61 that is screwed to the connecting member 31. If the adhesive 49 and elastic member 51 deteriorate after use, the work holder 25 as a whole may be replaced with anew one. This simplifies the maintenance of each work holder 25.

According to the embodiment, the work setting apparatus 7 employs the work holders 25 each having the adhesive 49 to hold the second work W2. The work setting apparatus 7, therefore, can set the second work W2 held by the work holders 25 onto the first work W1 after a vacuum atmosphere is formed, thereby surely preventing air from penetrating between the first and second works W1 and W2.

According to the embodiment, the work setting apparatus 7 is capable of releasing the second work W2 from the work holders 25 and letting the second work W2 freely fall so that the second work W2 is set onto the first work W1. When the second work W2 is released from the work holders 25, inner stress of the second work W2 is relieved to cancel a warp in the second work W2. With the inner stress relieved, the second work W2 is properly set onto the first work W1. This prevents the second work W2 from being set onto the first work W1 in a warped state.

Releasing the second work W2 from the work holders 25 and letting the second work W2 free-fall and set onto the first work W1 result in preventing the work holders 25 from leaving footmarks on the second work W2. Even if the first and second works W1 and W2 thermally expand when heated with the heater, releasing the second work W2 from the work holders 25 and letting the second work W2 free-fall and set onto the first work W1 minimize thermal-expansion inner stress to be created inside the first and second works W1 and W2.

According to the embodiment, the work setting apparatus 7 is capable of driving the table positioning unit 45 to slightly vibrate the first and second works W1 and W2 set on the lower table 15 when the work holders 25 are separated away from the second work W2. This enables the adhesive 49 of each work holder 25 to be easily removed from the second work W2.

The technique of driving the table positioning unit 45 to slightly vibrate the first and second works W1 and W2 set on the lower table 15 and separating the work holders 25 from the second work W2 may be modified to vibrating at least the second work W2 or the work holders 25, which are holding the second work W2 with the use of at least one of vacuum suction and adhesive, and separating the work holders 25 from the second work W2.

According to the present invention, the work setting apparatus 7 may exclude the vacuum atmosphere forming unit 21, or may not form a vacuum atmosphere by the vacuum atmosphere forming unit 21. In this case, it is possible to omit the adhesive 49 from each work holder 25.

When the vacuum atmosphere forming unit 21 and adhesive 49 are omitted, the control unit 13 controls the work setting apparatus 7 as mentioned below.

Namely, in a state that the upper table 17 is separated away from the lower table 15, the work holders 25 are present between the lower and upper tables 15 and 17, the first work W1 is set on the lower table 15, and the second work W2 is held by the work holders 25, the control unit 13 lowers the work holders 25 until a short distance is established between the first work W1 set on the lower table 15 and the second work W2 held by the work holders 25.

At this time, the work holders 25 hold the second work W2 only by vacuum suction.

Thereafter, the control unit 13 lowers the upper table 17 to drop the second work W2 from the work holders 25 so that the uncured membranous material W6 of the second work W2 comes in contact with the first work W1 and the second work W2 is set onto the first work W1.

The control unit 13 further lowers the upper table 17 to press the first and second works W1 and W2 between the upper and lower tables 17 and 15 for a predetermined time.

If the vacuum atmosphere forming unit 21 is omitted without omitting the adhesive 49, the work holders 25 hold the second work W2 with the use of both the vacuum suction and adhesive 49, or only the adhesive 49.

In this way, the present invention provides the effect of setting a first work as it is held by a plurality of work holders onto a second work, and thereafter, easily removing the work holders from the first work.

This application claims benefit of priority under 35 USC §119 to Japanese Patent Application No. 2011-263407, filed on Dec. 1, 2011, the entire contents of which are incorporated by reference herein.

What is claimed is:

1. A work setting apparatus comprising:
a first table on which a first work is set;
a second table movable toward and away from the first table and positioned with respect to the first table;
a table positioning unit configured to move and position the first table with respect to the second table in directions orthogonal to the moving directions of the second table;
a work holding unit comprising a plurality of work holders, each of the work holders comprising a cylindrical main body and an adhesive arranged at an opening of the main body, the adhesive of each of the work holders facing the first table, the work holders holding a second work with the use of either the adhesive or the adhesive plus vacuum suction and being movable toward and away from the first table in a direction parallel to the moving directions of the second table and positioned with respect to the first table; and a control unit configured to control the first table, second table, work holding unit, and table positioning unit, and in a state wherein the second table is separated away from the first table, the work holders are positioned between the first and second tables, the first work is set on the first table, and the second work is held by the work holders:

move the work holders toward the first table so that an uncured membranous material of the second work held by the work holders is brought into contact with the first work set on the first table and the second work is set onto the first work, move the second table toward the first table so that the first and second works are pressed between the first and second tables, after carrying out the pressing of the first and second works for a predetermined time, move the second table away from the first table so that the second table is separated from the second work, and drive the table positioning unit to slightly vibrate the first and second works on the first table and move the work holders away from the first table in a direction parallel to the moving directions of the second table so that the work holders are removed from the second work.

2. The work setting apparatus of claim 1, further comprising:

a vacuum atmosphere former configured to place the first and second works in a vacuum atmosphere when the second work held by the work holders is set onto the first work set on the first table, wherein:

in a state that the second table is separated away from the first table, the work holders are positioned between the first and second tables, the first work is set on the first table, and the second work is held by the work holders in such a way as to correct a positional error between the first and second works by the table positioning unit, and the control unit is configured to form a vacuum atmosphere by the vacuum atmosphere former, and move the work holders in the vacuum atmosphere toward the first table so that the uncured membranous material of the second work is brought into contact with the first work and the second work is set onto the first work.

3. The work setting apparatus of claim 1, wherein:

each of the work holders is configured so that pressurized air is supplied into the cylindrical main body of the work holder; and the control unit is configured to supply pressurized air into the cylindrical main body of each of the work holders so that the work holders are removed from the second work after pressing the first and second works and separating the second table from the second work.

* * * * *